Oct. 17, 1961 O. PINKUS ET AL 3,004,804
PIVOTED SHOE BEARING WITH FORCE-FEED LUBRICATION
Filed Aug. 26, 1959
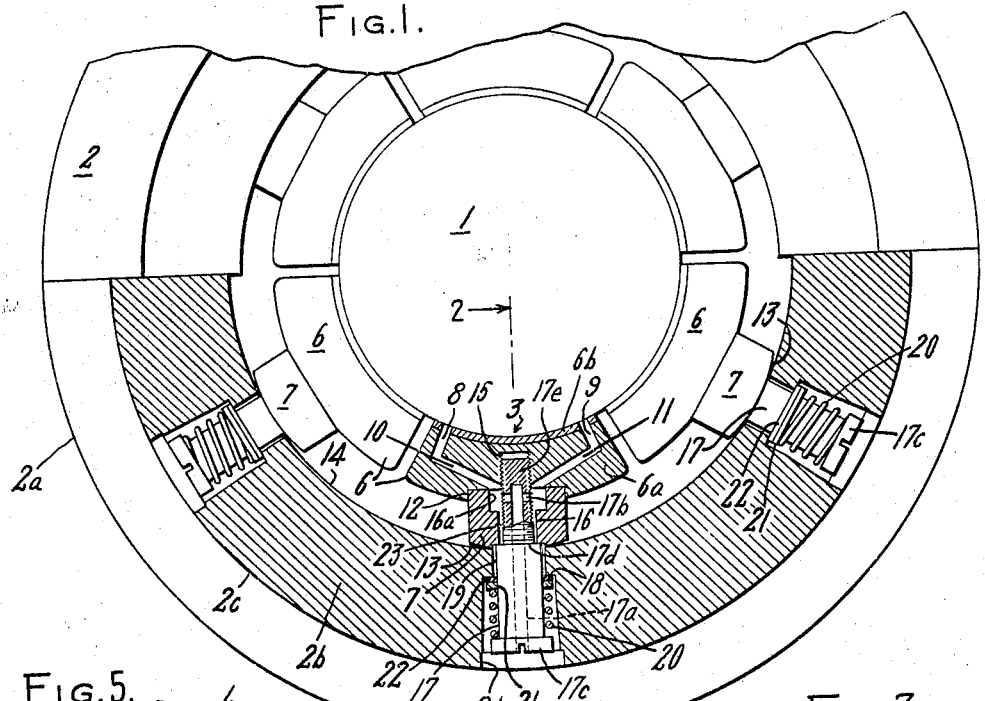
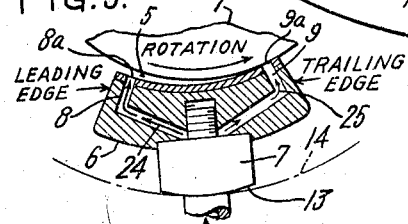
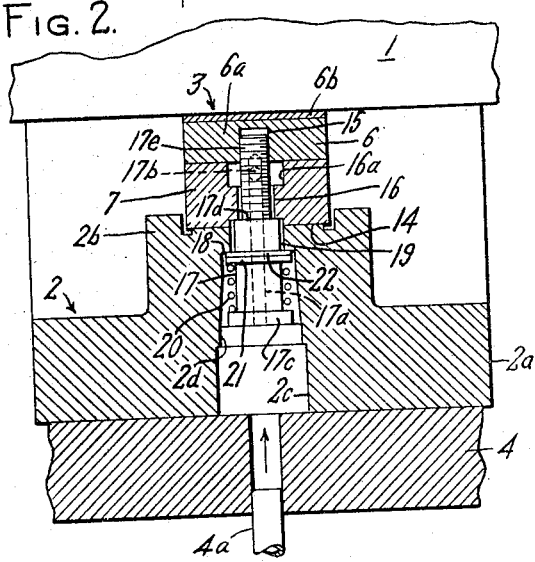
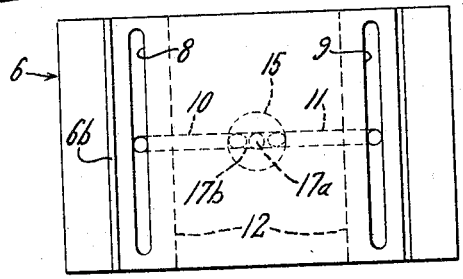
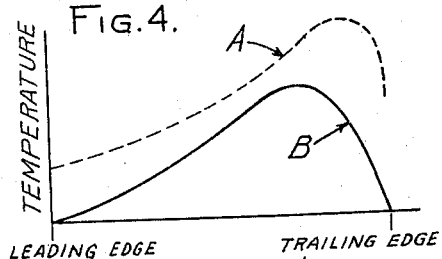
Inventors
Oscar Pinkus
Richard J. Smith
by W. C. Crutcher
Their Attorney

United States Patent Office 3,004,804
Patented Oct. 17, 1961

3,004,804
PIVOTED SHOE BEARING WITH FORCE-FEED LUBRICATION
Oscar Pinkus, Cambridge, and Richard J. Smith, North Wilmington, Mass., assignors to General Electric Company, a corporation of New York
Filed Aug. 26, 1959, Ser. No. 836,247
6 Claims. (Cl. 308—73)

This invention relates to the lubrication of bearings employing pivoted bearing shoes and more particularly it relates to an improved force-feed lubricating arrangement for use in a pivoted shoe journal bearing.

It has been recognized that the operating characteristics of journal bearings which are intended to undergo severe operating conditions may be improved, in some cases, by supporting the shaft with a number of separated bearing shoes. These shoes may be mounted so as to "pivot" slightly in the bearing housing in order to facilitate the formation of an optimum wedge-shaped film of oil between the bearing shoe and the shaft, as is well known to those acquainted with the bearing art.

The conventional practice consists in flooding the space between the shaft and the oil seals with lubricant which is then "dragged" into the space between the shoe and the shaft at the leading edge of the shoe, to be discharged at the trailing edge of the shoe. Due to the relative incompressibility of the lubricant, the oil must also flow transversely from both sides of the shoe as the oil wedge becomes thinner toward the trailing edge of the shoe. Difficulty is encountered at high speeds, however, due to turbulence in the radial clearance gap between adjacent shoes, and in the space between shoes and oil seals which results both in excessive power losses and in the reluctance of oil to enter between the shaft and the shoe.

It has previously been suggested that these problems in high speed bearings may be reduced by introducing oil directly at the bearing shoe surface adjacent the shaft rather than by flooding the bearing in an enclosed housing and depending upon the rotation of the shaft to draw oil into the clearance space. Such suggestions have had the disadvantage that encumbering pipes or flexible conduits, which affected the free pivoting of the shoe, were required to introduce the lubricant into the shoe.

The dissipation of heat from a bearing is of primary concern, since the ability of the bearing to carry the load depends in a large part upon the viscosity of the lubricant, and the viscosity, in turn, is variable with the temperature, a higher temperature generally giving a lower viscosity. If the speed of the shaft, therefore, reaches such a point that the heat is not dissipated as fast as it is generated, the oil film may break down and the result will be that the shaft will "wipe" the comparatively soft Babbitt or other rubbing material from the face of the bearing shoe. Even more important than the danger of "wiping" the bearing material from the shoe is the danger of softening or actually melting the bearing material due to excessive temperatures in the lubricant. If the lubricant is not cooled properly, it can exceed the 300° F. or so at which the Babbitt softens with severe resultant damage to the bearing. It is desirable, therefore, to provide a means of cooling the shoe at the location of maximum temperatures.

Accordingly, one object of the present invention is to reduce the power losses due to turbulence of the lubricant in pivoted shoe bearings.

Another object is to reduce the operating temperature of the lubricant in a pivoted shoe journal bearing at the point where the oil film is the thinnest and most likely to break down.

Still another object is to provide an improved device for feeding lubricant under pressure to the working surface of a pivoted shoe bearing without undue leakage.

Another object is to provide a simplified construction for a pivoted shoe bearing requiring no oil seals to retain the lubrican around the bearing shoes.

Still another object is to reduce the quantity of lubricant required in a pivoted shoe journal bearing, thus saving space and reducing the required capacity of the lubrication system.

Another object is to provide an improved forced lubrication journal bearing capable of operating in either direction at high speeds.

The subject matter which we regard as our invention is particularly pointed out and distinctly claimed in the concluding portion of this specification. Our invention, both as to organization and method of practice, together with further objects and advantages thereof, may best be understood by reference to the following description taken in connection with the accompanying drawing in which:

FIG. 1 is an end view, partly in section, of a pivoted shoe journal bearing showing the details of one of the shoes;
FIG. 2 is a view taken along lines 2—2 of FIG. 1;
FIG. 3 is a detailed plan view of a bearing pad, looking radially outward;
FIG. 4 is a graph showing a typical temperature distribution curve along the bearing pad of FIG. 3; and
FIG. 5 is a diagrammatic view of a single shoe showing the oil flow.

Generally stated, the invention is practiced by introducing lubricant under pressure at the pivot point of the shoe through a resiliently-sealed and shielded hollow screw or pipe which is threaded into the bearing pad of the shoe. One portion of the lubricant is conducted to the leading edge of the shoe where it furnishes oil for forming the wedge-shaped bearing film. The other portion of the lubricant is introduced at the trailing edge of the shoe to cool the oil film at the point of highest temperature. When the shaft rotation is reversed, the oil grooves automatically exchange functions.

Referring now to FIG. 1, a rotating shaft 1 is supported in a bearing housing 2 by a number of spaced pivoted bearing shoes, one of which may be seen in detail at 3. The bearing housing 2 has a generally cylindrical outer rim 2a with a central radially extending flange 2b which acts to receive the load from shaft 1 through bearing shoes 3. A circumferential groove 2c is cut in the rim 2a in line with the inner radial flange 2b. In the bottom of the groove 2c are a number of radial openings 2d spaced about the circumference of flange 2b for the admission of lubricant. The housing is surrounded by an oil supply rim 4 (shown in FIG. 2 only) which retains the lubricant in groove 2c after it enters through a supply pipe 4a.

The bearing shoes 3 consist of bearing pads 6 and bearing pivot blocks 7. Looking at the bearing pad 6, it may be seen to be comprised of a structural support portion 6a and a wear portion 6b. The support portion 6a may be constructed of steel in order to carry the load and the wear portion 6b may consist of Babbitt or some other low friction material which is dovetailed or bonded in some other suitable manner to the support portion 6a. The method of fastening wear portion 6b onto structural portion 6a is not material to the present invention, however one possible method is disclosed in Patent No. 1,460,515, issued to H. Selker on July 3, 1923.

Referring to FIG. 3, it is seen that the surface of pad 6 is furnished with two separate axially directed recesses 8, 9 which are fed by internal conduits 10, 11 in the pad. It is particularly to be noted that recesses 8, 9 are circumferentially separated from one another and located at opposite ends of the pad. This permits the oil to be introduced to the space between the pad and the shaft at two separated points, one adjacent the leading edge of the shoe and the other adjacent the trailing edge of the shoe. Recesses 8, 9 are preferably located symmetrically with the axis of the pad so that upon shaft reversal they will simply exchange functions.

The back surface of pad 6 is provided with an axially extending locating recess 12 and internal conduits 10, 11 are arranged to converge toward the symmetrical axis of pad 6 so that they will intersect the back surface of the pad at a location withing recess 12. Pivot block 7, which is of the same axial width as pad 6 (see FIG. 2), fits in recess 12, as can be seen by reference to FIG. 1. The outer surface of pivot block 7 is arcuate as seen at 13 so as to provide a surface which will "rock" on the inner surface 14 of flange 2b. This will permit pad 6 and pivot block 7 to pivot slightly so as to facilitate pad movement and to aid in the formation of the wedge-shaped oil film upon which shaft 1 will be supported.

Reference to the diagrammatic showing in FIG. 5 will illustrate how pad 6 and pivot block 7 rock as a unit to form a wedge-shaped clearance space 5. It will be understood that clearance 5 has been greatly exaggerated for purposes of illustration. It will also be seen that recesses 8, 9 in the pad define orfices 8a, 9a respectively with shaft 1, which will vary according to the angle of tilt assumed by the shoe.

Pad 6 has a threaded hole 15 on its axis of symmetry and pivot block 7 likewise has a bored hole 16 aligned with threaded hole 15 but larger so as to form a substantial clearance space 23 with the threaded member 17e. Hole 16 in pivot block 7 is also enlarged to a diameter 16a on the inner surface of the pivot block so as to encompass the openings of conduits 10 and 11 in the pad (FIG. 1).

Extending through hole 2d in housing flange 2b and through hole 16 in pivot block 7 and threaded into the hole 15 in the bearing pad is an oil supply pipe 17. This consists of a hollow "stepped diameter" bolt which is drilled with an internal conduit 17a and which is also drilled with intersecting conduits 17b at a point within the enlarged diameter 16a in the pivot block. Thus oil introduced under pressure into hole 17a in the bolt will be divided into two portions by holes 17b to be discharged through conduits 10, 11 in the pad and recesses 8, 9 in the pad surface respectively.

The oil supply pipe 17 has a threaded end portion 17e and a shoulder 17d which will tightly engage pivot block 7 as bolt end portion 17e is tightened in hole 15 of pad 6 to hold the pivot block 7 against the bearing pad 6 and to form a seal against leakage. Hole 2d in the housing flange 2b is formed so as to provide a shoulder 18 and is large enough to provide a clearance space 19 around the pipe 17 to provide for slight movement of the oil supply pipe, as will be described later. Disposed between an enlarged head 17c of pipe 17 and the shoulder 18 is a compression spring 20, a washer 21, and a gasket 22. Gasket 22 is of a compressible material so that as pipe end 17e is tightened into threaded hole 15, spring 20 will be compressed and will cause the washer 21 to compress gasket 22 to complete the oil seal for clearance space 19.

As noted above, there is a clearance space 19 between pipe 17 and housing flange 2b and a clearance space 23 between block 7 and threaded portion 17e. These clearance spaces serve to restrict the flow of heat from shoe 3 to the pipe 17 since the only points of metal-to-metal contact between the pipe and the shoe are at threaded recess 15 and the shoulder 17d. Thus oil entering through conduit 17a will be maintained at as low a temperature as is desired. The importance of thus maintaining the oil at a low temperature will be noted from the following description of this improved pivoted shoe lubricator.

The graph of FIG. 4 will illustrate the operation of our improved device. Plotted in FIG. 4 is the temperature profile along the circumferential length of the surface of pad 6 corresponding to the linear distance between grooves 8 and 9, shown both with and without the benefit of our improved oil feeding system. It is to be understood that the curve shown is for purposes of illustrating the principle of operation and does not indicate quantitative temperature measurements. The temperature of the pad is plotted as the ordinate; the left-hand side of the figure represents the leading edge of the pad of FIG. 3, with the right-hand end of the abscissa representing the trailing edge of the pad.

Perhaps the most conventional practice for lubricating pivoted shoe bearings is to utilize a flooded bearing where the lubricant is admitted from the chamber surrounding the shoes. The oil enters at the leading edge of the pad and is discharged transversely from the sides of the pad as it progresses between the shoe and the shaft. The temperature distribution of a typical pivoted shoe bearing employing this method of lubrication is shown by dotted curve A on the graph. It will be seen that the lubricant enters at a fairly high temperature on the left side of the diagram which is substantially the temperature of the hot lubricant surrounding the shoes and increases to a peak temperature very near the trailing edge of the pad. The reason for this may be briefly theorized as follows. The initial charge of lubricant admitted at the leading edge of the pad progressively picks up heat as it is dragged by the relative rotation toward the trailing edge, due to friction in the oil film. Also, the wedge-shaped oil film becomes appreciably thinner as it progresses toward the trailing edge, due to the transverse discharge of the oil from the pad under the influence of the increasing hydrodynamic pressure built-up in the oil film. This will be obvious from FIG. 5. Therefore, the temperature of the oil film approaches a peak toward the trailing edge of the shoe.

Solid curve B of the graph shows the temperature profile obtainable with our improved device, where oil is introduced at widely separated locations, near both the leading and trailing edges of the pad in accordance with the invention. The lubricant entering by groove 8 is much cooler than obtainable with a flooded bearing since it enters from outside the housing where the temperature can be controlled. The lubricant entering toward the trailing edge by groove 9 serves as a coolant for the oncoming oil film, and for the shaft and pad adjacent the trailing edge. This results in the temperature peak of curve A being substantially lowered and shifted back toward the middle portion of the shoe. In other words, the lubricant performs two separate functions by virtue of being introduced at two widely separated and unconnected circumferential locations. The larger portion of the lubricant entering at the leading edge (arrows 24 in FIG. 5) furnishes the supply of cool oil for formation of the wedge-shaped oil film upon which the shaft will ride, while the other smaller portion of lubricant introduced at the trailing edge of the shoe (arrows 25 in FIG. 5) acts primarily as a cooling agent. The lengths of arrows 24, 25 are illustrative of the quantity of lubricant flowing. This cools the shoe and lowers the peak oil film temperature, with a subsequent increase in carrying capacity of the bearing due to the higher viscosity of the lubricant at the highest pressure portion of the bearing surface, and also provides an extension of operating range due to a lower maximum temperature.

It is particularly to be noted that recesses 8 and 9 are located at unconnected and widely separated locations on the surface of pad 6, preferably as close to the leading and trailing edges respectively as possible in order to give the most possible bearing surface between recesses, and in order that the flow of oil from the sides of the pad may be unimpeded. The latter is quite important since this transverse oil flow is proportional to the transverse pressure gradient from the middle of the pad to substantially atmospheric pressure at the sides. The ability of the lubricant to cool the high temperature center portion of the shoe depends, to a large extent, on a substantial transverse oil flow.

The operation of the pivoted shoe lubricating arrangement will now be described. As the shaft begins to rotate in the direction of the arrow, the left-hand edge of pad 6 will tilt radially away from the shaft and the right-hand edge will tilt toward the shaft (FIG. 5) providing that lubricant is available to form the wedge-shaped oil film. As will be apparent from the drawing, the tilting of pad 6 is accomplished by the pad 6 rocking on surface 13 of pivot block 7. It is to be noted that only very slight movement is required to form the proper oil film, since the radial movement of the ends of pad 6 is magnified by the fact that the surface of pad 6 is arcuate. Pipe 17, which is securely threaded into pad 6, will likewise pivot with respect to the flange 2b of the housing. Clearance space 19 between pipe 17 and housing flange 2b provides for the slight tilting of pipe 17 as it follows the movement of pad 6. Since pipe 17, pivot block 7, and pad 6 "rock" as a unit, the seal at 17d is not disturbed by this movement. Leakage is prevented between pipe 17 and the flange, since spring 20 will continue to act upon gasket 22 at an angle to keep it in its compressed state. Therefore, an effective seal is maintained between the oil feed inlet pipe 17 and housing 2 to prevent the leakage of lubricant from the housing, although gasket 22 may slide transversely, to a slight degree, on shoulder 18, as permitted by the circumferential clearance between the outer periphery of gasket 22 and the recess 2d. Introduction of the lubricant at the sealed pivot point serves to provide forced-feed lubrication without hampering the free tilting of the shoes 3.

It may also be noted that the tilting of the shoe, as in FIG. 5, has the effect of automatically tending to somewhat obstruct the flow of oil from the "downstream" oil supply orifice 9a while leaving relatively less obstructed the "upstream" supply orifice 8a. Thus the larger fraction of the oil supplied flows through orifice 8a to the leading edge of the shoe for establishing the oil film and the smaller portion flows through orifice 9a at the trailing edge for cooling the high pressure area of the bearing surface. When the direction of shaft rotation reverses, the opposite tilting of the shoe automatically opens up orifice 9a and closes down orifice 8a. Thus the bearing works equally well for both directions of rotation. The degree of tilt in operation which determines the openings of orifices 8a, 9a and thus the relative flow of lubricant from recesses 8, 9, can be calculated and is dependent upon several parameters including load, speed, viscosity, shaft diameter and the initial clearance.

Thus the entering oil is force-fed to the space between the shaft and the pad through the pivot point and is divided into two entirely separate portions, one providing lubrication and the other providing cooling at the peak temperature point near the trailing edge, thus substantially lowering the operating temperature of the bearing.

While there has been described what is at present considered to be the preferred embodiment of the invention, it will be understood that various modifications may be made therein, and it is intended to cover in the appended claims all such modifications which fall within the scope of this invention.

What we claim as new and desire to secure by Letters Patent of the United States is:

1. A lubricated pivoted shoe for a journal bearing including a shaft and a coaxial radially spaced housing wall, said shoe being located between said shaft and said housing wall, said shoe defining a first arcuate wear surface disposed in rubbing relation with the shaft and defining first and second circumferentially separated axially extending oil supply recesses located adjacent but spaced from the respective ends of the wear surface, said shoe also defining a second arucate fulcrum surface located radially outward from the first wear surface, whereby the shoe may rock on the second surface to aid in forming a wedge-shaped oil film, the shoe also defining first and second internal conduits communicating separately with and forming the only interconnection between said first and second recesses respectively, common oil supply conduit means connected to said first and second internal conduits and extending through said second arcuate surface, and means to supply lubricant under pressure to said common oil supply conduit means.

2. In a journal bearing the combination of a shaft, a bearing housing defining a cylindrical housing surface radially spaced from said shaft and defining a plurality of circumferentially spaced radially directed holes communicating with the outside of the housing, a plurality of pivoted shoes circumferentially spaced between the shaft and the housing surface, each of said shoes defining internal conduits for supplying lubricant to circumferentially spaced portions of the clearance space between shoe and shaft and having on one side a first arcuate surface disposed in rubbing relation with the shaft and on the other side a second arcuate surface disposed to rock on an inner surface of the housing, oil supply conduit means loosely disposed in each of said radial housing holes with the inner end thereof secured to a shoe in communication with said shoe internal conduits, resiliently biased sealing means disposed between the oil supply conduit means and the housing whereby leakage of oil from the housing is prevented as the bearing shoes rock on said second arcuate surfaces.

3. In a journal bearing the combination of a shaft, a bearing housing defining a cylindrical housing inner surface radially spaced from said shaft and defining a plurality of circumferentially spaced radially directed holes communicating with the outside of the housing, a plurality of pivoted shoes circumferentially spaced between the shaft and the housing inner surface, each of said shoes defining a first arcuate wear surface disposed in rubbing relation with the shaft and defining first and second circumferentially spaced axially directed recesses located adjacent but spaced from the leading and trailing edges respectively of the wear surface, said shoe also having a second arcuate surface located radially outward from the first wear surface, whereby the shoe may rock on said second surface to aid in forming a wedge-shaped oil film, the shoe also defining first and second internal conduits separately communicating with said first and second recesses respectively, oil supply conduit means loosely disposed in said radial housing holes with the inner end thereof secured to the shoes so as to connect with the first and second internal conduits and extending through the second arcuate shoe surface, resiliently biased sealing means disposed between the oil supply conduit means and the housing whereby leakage of oil from the housing is prevented as the bearing shoes rock on the second arcute surfaces, and means to supply lubricant under pressure to said oil supply conduit means.

4. A lubricated pivoted shoe for a journal bearing including a shaft and a coaxial radially spaced housing defining radially directed lubricant supply holes, said shoe comprising bearing pad means having an arcuate wear surface disposed in rubbing relation with the shaft and defining first and second circumferentially spaced axially directed recesses located adjacent the leading and trailing edges respectively of said bearing pad wear surface, pivot block means having an arcuate pivot surface and defining an oil supply opening extending through said pivot surface, means locating said bearing pad means symmetrically with respect to said pivot block means, the bearing pad means and the pivot block means together defining first and second internal conduits connecting with said first and second recesses respectively and converging into a common oil supply chamber, an oil supply pipe having an outside diameter less than said radial housing holes and securely attached at the inner end thereof to said bearing shoe so as to discharge into said common oil supply chamber, and resiliently biased sealing means disposed between the oil supply pipe and the housing to prevent leakage as said oil supply pipe pivots with respect to the housing.

5. A pivoted shoe for a segmental journal bearing comprising a first arcuate shoe member defining an arcuate bearing surface on one side thereof, a fulcrum block member engaging the mid-portion of the side of the shoe member opposite from said bearing surface, said fulcrum block having an arcuate bearing surface on the side thereof away from the shoe and adapted to rock on a supporting surface of the bearing housing about an axis parallel to the axis of the shaft, the bearing surface of the shoe having separated axially extending oil supply grooves, one adjacent but spaced from either end of the shoe, the shoe having separate passages communicating with and forming the only interconnection between said respective grooves, and conduit means projecting through said fulcrum block for supplying lubricant to said shoe passages.

6. A lubricated bearing for a movable member comprising a pivoted shoe for supporting said member, said shoe comprising bearing pad means having a wear surface disposed in rubbing relation with the movable member, first and second longitudinal recesses located in said wear surface and separated from each other in the direction of movement of said member, pivot block means for supporting said shoe and having an oil supply opening extending through the pivot block means, means supporting said bearing pad means on said pivot block means, said bearing pad means having internal conduits forming the only interconnection between each of said longitudinal recesses and the oil supply opening, and means to supply lubricating oil to said supply opening.

References Cited in the file of this patent

UNITED STATES PATENTS

| | | |
|---|---|---|
| 2,348,928 | Sampatacos | May 16, 1944 |
| 2,363,260 | Peskin | Nov. 21, 1944 |